US012694889B2

(12) United States Patent
Hamlin et al.

(10) Patent No.: US 12,694,889 B2
(45) Date of Patent: Jul. 28, 2026

(54) PROFANITY FILTER FOR COLLABORATION SESSIONS IN HETEROGENOUS COMPUTING PLATFORMS

(71) Applicant: Dell Products, L.P., Round Rock, TX (US)

(72) Inventors: Daniel L. Hamlin, Round Rock, TX (US); Srikanth Kondapi, Austin, TX (US); Todd Erick Swierk, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 418 days.

(21) Appl. No.: 17/930,009

(22) Filed: Sep. 6, 2022

(65) Prior Publication Data

US 2024/0079025 A1 Mar. 7, 2024

(51) Int. Cl.
| | |
|---|---|
| *G06F 8/60* | (2018.01) |
| *G06F 9/50* | (2006.01) |
| *G10L 21/0272* | (2013.01) |
| *G10L 25/51* | (2013.01) |
| *H04L 12/18* | (2006.01) |
| *H04M 3/436* | (2006.01) |
| *H04M 3/56* | (2006.01) |

(52) U.S. Cl.
CPC ............ *G10L 25/51* (2013.01); *G06F 9/5005* (2013.01); *G10L 21/0272* (2013.01); *G06F 2209/5016* (2013.01)

(58) Field of Classification Search
None
See application file for complete search history.

(56) References Cited

U.S. PATENT DOCUMENTS

| | | | | |
|---|---|---|---|---|
| 9,711,146 | B1* | 7/2017 | Cronin | G06Q 50/01 |
| 2017/0126812 | A1* | 5/2017 | Singhal | H04L 67/142 |
| 2019/0174208 | A1* | 6/2019 | Speicher | G06F 1/163 |
| 2019/0354708 | A1* | 11/2019 | Fisher | G06F 16/212 |
| 2020/0221244 | A1* | 7/2020 | Peeler | G10L 21/0356 |
| 2021/0383824 | A1* | 12/2021 | Condorelli | H03G 3/342 |
| 2023/0016473 | A1* | 1/2023 | Panwar | H04N 19/127 |
| 2023/0353606 | A1* | 11/2023 | DiPaulo | G10L 15/08 |

* cited by examiner

*Primary Examiner* — Pierre Louis Desir
*Assistant Examiner* — Kristen Michelle Masters
(74) *Attorney, Agent, or Firm* — Fogarty LLP

(57) ABSTRACT

Systems and methods for filtering profanities during collaboration sessions in heterogenous computing platforms are described. In an illustrative, non-limiting embodiment, an Information Handling System (IHS) may include: a heterogeneous computing platform having a plurality of devices and a memory coupled to the heterogeneous computing platform, where the memory includes a plurality of sets of firmware instructions, where each set of firmware instructions, upon execution by a respective device, enables the respective device to provide a corresponding firmware service, and where at least one of the plurality of devices operates as an orchestrator configured to: receive a policy from an Information Technology Decision Maker (ITDM) or Original Equipment Manufacturer (OEM), and select a profanity filter setting usable during a collaboration session based, at least in part, upon the policy.

20 Claims, 9 Drawing Sheets

100

300

500

RECEIVE POLIC(IES) ⌒701

COLLECT TELEMETRY ⌒702

EVALUATE AND IDENTIFY WORKLOAD(S) ⌒703

RULE(S) MATCH? 704

NO

YES

TRIGGER ACTION(S) 705

700

RECEIVE POLIC(IES) ⌒801

DETECT CONTEXT ⌒802

MANAGE TELEMETRY COLLECTION ROUTINE(S) ⌒803

800

901  RECEIVE POLICY FROM ITDM/OEM

902  ENABLE FIRMWARE SERVICE(S)

903  RECEIVE CONTEXTUAL AND/OR TELEMETRY INFORMATION

904  POLICY RULE(S) MET?

NO

YES

905  SELECT PROFANITY FILTER SETTING(S)

900

1000

PROFANITY FILTER FOR COLLABORATION SESSIONS IN HETEROGENOUS COMPUTING PLATFORMS

FIELD

This disclosure relates generally to Information Handling Systems (IHSs), and more specifically, to systems and methods for filtering profanities during collaboration sessions in heterogenous computing platforms.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, IHSs with desktop and laptop form factors have had full-fledged Operating Systems (OSs) (e.g., WINDOWS, LINUX, MAC OS, etc.) executed on "x86" processors. Other types of processors, such as ARM processors, have been associated with smartphones and tablet devices, which typically carry thinner, simpler, or mobile OSs (e.g., ANDROID, iOS, WINDOWS MOBILE, etc.). In recent years, however, IHS manufacturers have started releasing desktop and laptop IHSs equipped with ARM processors, and newer OSs (e.g., WINDOWS on ARM) can now provide users with a more quintessential OS experience on those IHSs.

The inventors hereof have recognized that the IHS industry's transition from x86 to ARM-based processors has created new management, deployment, customization, and configuration opportunities for IHS users, Information Technology Decision Makers (ITDMs), and Original Equipment Manufacturers (OEMs).

SUMMARY

Systems and methods for filtering profanities during collaboration sessions in heterogenous computing platforms are described. In an illustrative, non-limiting embodiment, an Information Handling System (IHS) may include a heterogeneous computing platform having a plurality of devices and a memory coupled to the heterogeneous computing platform, where the memory includes a plurality of sets of firmware instructions, where each set of firmware instructions, upon execution by a respective device, enables the respective device to provide a corresponding firmware service, and where at least one of the plurality of devices operates as an orchestrator configured to: receive a policy from an Information Technology Decision Maker (ITDM) or Original Equipment Manufacturer (OEM), and select a profanity filter setting usable during a collaboration session based, at least in part, upon the policy.

The heterogeneous computing platform may include: a System-On-Chip (SoC), a Field-Programmable Gate Array (FPGA), or an Application-Specific Integrated Circuit (ASIC). The orchestrator may include a sensing hub, an Embedded Controller (EC), or a Baseboard Management Controller (BMC).

The collaboration session may include an audio or video conference. In some cases, the orchestrator may be configured to receive a message or an instruction from an Operating System (OS) agent or application that indicates a start of the collaboration session.

The profanity filter setting may include an on or off setting. Additionally, or alternatively, the profanity filter setting may include one of a plurality of filtering modes, each filtering mode having a different level of aggressiveness or permissiveness. Additionally, or alternatively, the profanity filter setting may include an indication of a list of profane words or utterances. Additionally, or alternatively, the profanity filter setting may include a speaker separation option.

The orchestrator may be further configured to send a message to a firmware service provided by an audio Digital Signal Processor (aDSP) via one or more Application Programming Interfaces (APIs) without any involvement by any host OS to apply a profanity filtering model to an audio stream based on the profanity filter setting.

The profanity filter setting may identify one or more participants of the collaboration session whose respective audio stream is included in, or excluded from, profanity filtering. The orchestrator may be configured to, upon detection of profanity in an audio stream, at least one of: adjust a volume of a microphone input, adjust a volume of an audio output, apply an audio effect to a portion of the audio stream, replace the profanity with another word or utterance, flag a participant responsible for the audio stream, or notify the participant.

In some cases, application of the profanity filtering model may be based, at least in part, upon contextual or telemetry information. The orchestrator may be configured to receive the contextual or telemetry data via another firmware service provided by one or more of the plurality of devices via one or more APIs without any involvement by any host OS.

For example, the contextual or telemetry information may include at least one of: a level of utilization of one or more of the plurality of devices, a battery status, a location of the IHS, or an identity of a user of the IHS. Additionally, or alternatively, the contextual or telemetry information may indicate a user's presence with respect to the IHS. Additionally, or alternatively, the contextual or telemetry information may indicate a user's level of engagement with respect to the collaboration session.

In another illustrative, non-limiting embodiment, a memory may be coupled to a heterogeneous computing platform, where the heterogeneous computing platform includes a plurality of devices, where the memory is configured to receive a plurality of sets of firmware instructions, where each set of firmware instructions, upon execution by a respective device, enables the respective device to provide a corresponding firmware service without any involvement by any host OS, and where at least one of the plurality of devices operates as an orchestrator configured to: receive context information; and modify a profanity filter setting usable during a collaboration session based, at least in part, upon the context information.

In yet another illustrative, non-limiting embodiment, a method may include: receiving a firmware installation package comprising extension drivers in a heterogeneous computing platform of the IHS, where the heterogeneous computing platform includes a plurality of devices, where upon execution, each extension driver causes a respective device to provide a firmware service to other devices via an API; and delivering an indication of a policy to an orchestrator among the plurality of devices, where the policy is usable by the orchestrator to filter out profanity during a collaboration session without any involvement by any host OS executed by the heterogenous computing platform.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
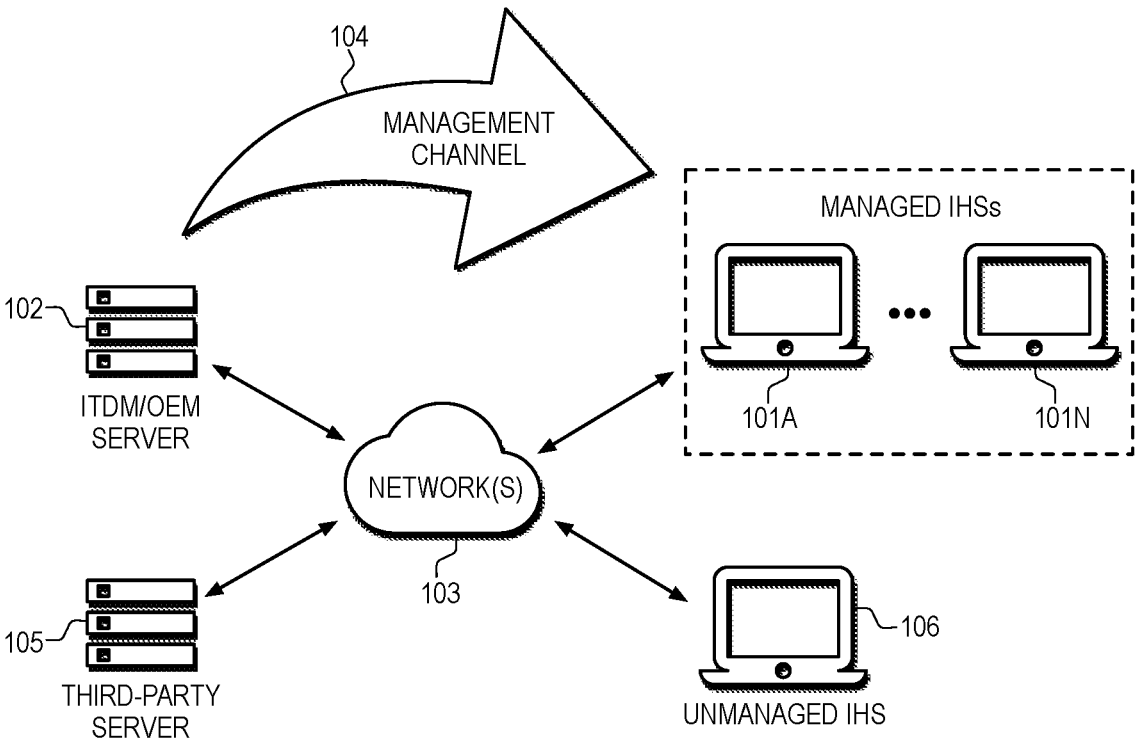
FIG. 1 is a diagram illustrating an example of a computing environment where systems and methods described herein may be implemented, according to some embodiments.

FIG. 1 is a diagram illustrating an example of computing environment 100 where systems and methods described herein may be implemented. In various embodiments, managed IHSs 101A-N may be accessible to Information Technology (IT) Decision Maker (ITDM) or Original Equipment Manufacturer (OEM) server 102 over network(s) 103 (e.g., the Internet, an intranet, etc.) via management channel 104. One or more of managed IHSs 101A-N may be equipped with one or more of IHS components 200 (FIG. 2), including heterogenous computing platform 300 (FIG. 3).

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc.

ITDM/OEM server 102 may be located on premises along with one or more managed IHSs 101A-N, or it may be remotely located with respect to managed IHSs 101A-N. For example, one or more of managed IHSs 101A-N may be deployed within an enterprise, business, or corporation having an ITDM in charge of managing usage, operation, configuration, and other aspects of managed IHSs 101A-N. Particularly, an ITDM may use one or more management tools executed by ITDM server 102 to establish management channel 104 with managed IHSs 101A-N. Examples of management tools may include, but are not limited to, WINDOWS Admin Center, MICROSOFT Endpoint Configuration Manager, System Center Configuration Manager (SCCM), AZURE, INTUNE, VMWARE WORKSPACE ONE, etc.

ITDM/OEM server 102 may be coupled to an ITDM or OEM database. Such a database may include, for example: an identification of managed IHSs 101A-N (e.g., by service tag, serial number, etc.), an inventory of IHS components installed in managed IHSs 101A-N (e.g., components integrated into managed IHSs 101A-N, peripheral devices coupled to managed IHSs 101A-N, etc.), an identification of a heterogenous computing platform 300 installed in managed IHSs 101A-N, a list of authorized users, usernames, passwords, logon credentials, cryptographic keys, digital certificates, Operating System (OS) installation or update packages, software application installation or update packages, firmware installation or update packages, hardware policies, software policies, telemetry collected from managed IHSs 101A-N, customer/client support information, etc.

In some cases, one or more management operations performed by ITDM/OEM server 102 via management channel 104 may be selected or modified, at least in part, based upon information stored in an ITDM or OEM database. For example, a different firmware installation package containing a base driver and/or one or more extension drivers (sometimes referred to as information or "INF" drivers) may be selected, assembled, and/or delivered to each given one of managed IHSs 101A-N specifically for the IHSs' heterogenous computing platform.

The term "firmware," as used herein, refers to a class of program instructions that provides low-level control for a device's hardware. Generally, firmware enables basic functions of a device and/or provides hardware abstraction services to higher-level software, such as an OS. The term "firmware installation package," as used herein, refers to program instructions that, upon execution, deploy device drivers or services in an IHS or IHS component.

The term "device driver" or "driver," as used herein, refers to program instructions that operate or control a particular type of device. A driver provides a software interface to hardware devices, enabling an OS and other applications to access hardware functions without needing to know precise details about the hardware being used. When an application invokes a routine in a driver, the driver issues commands to a corresponding device. Once the device sends data back to the driver, the driver may invoke certain routines in the application. Generally, device drivers are hardware dependent and OS-specific.

Still referring to environment 100, any of managed IHSs 101A-N may be in communication (e.g., video and/or audio communications, collaboration sessions, etc.) with any other one of managed IHSs 101A-N and/or with another, third-party IHS 106, which is not necessarily managed by ITDM/OEM server 102, over network(s) 103. Additionally, or alternatively, any of managed IHSs 101A-N may receive services (e.g., cloud or remote services) from third-party server 105. Examples of third-party server 105 include, but are not limited to, ZOOM servers, TEAMS servers, MICROSOFT EXCHANGE servers, SKYPE servers, etc. In some cases, communications between managed IHSs 101A-N and/or third-party IHS 106 may be supported, at least in part, by third-party server 105.

Figure 2:
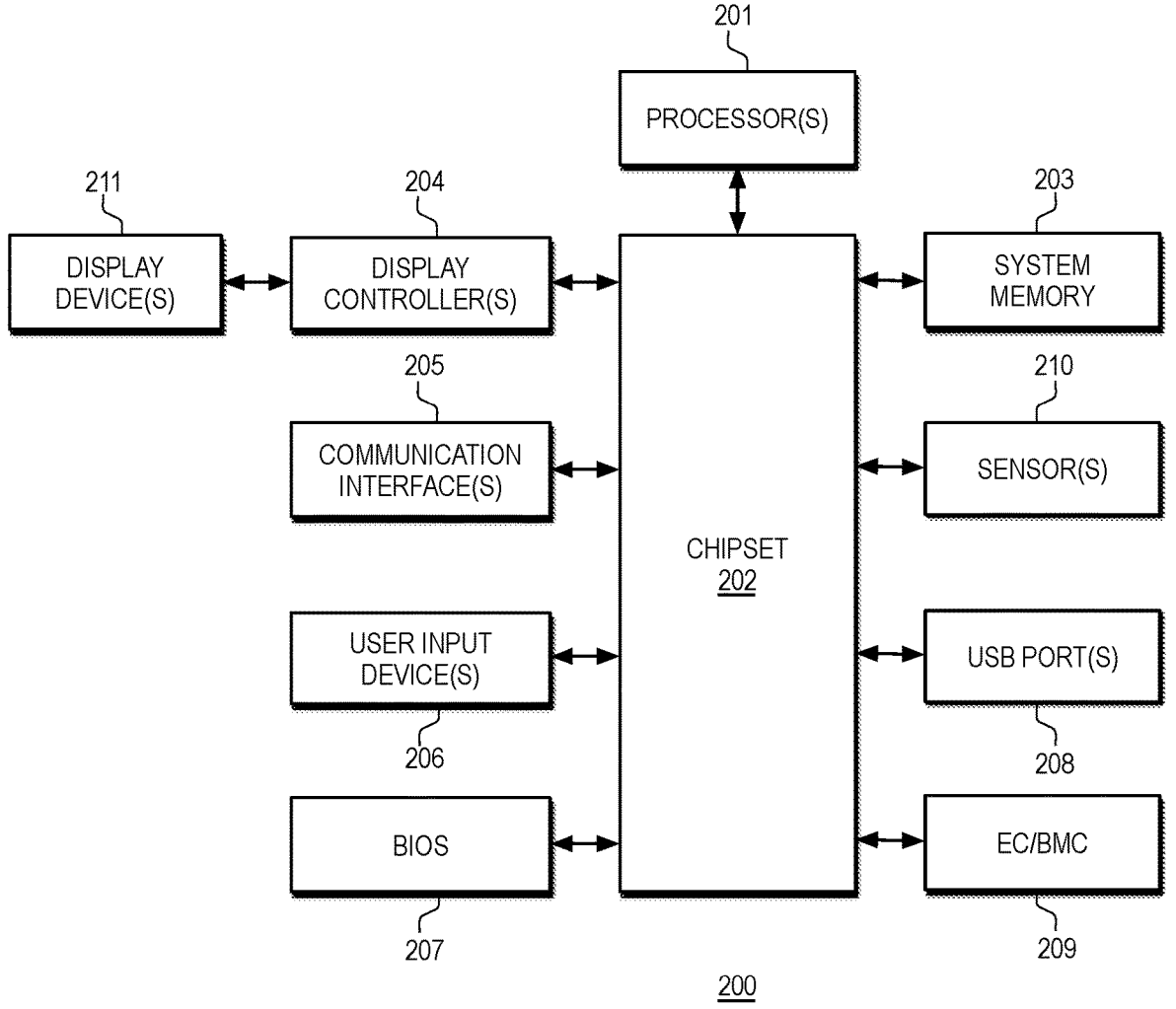
FIG. 2 is a diagram illustrating examples of components of an Information Handling System (IHS), according to some embodiments.
Figure 3:
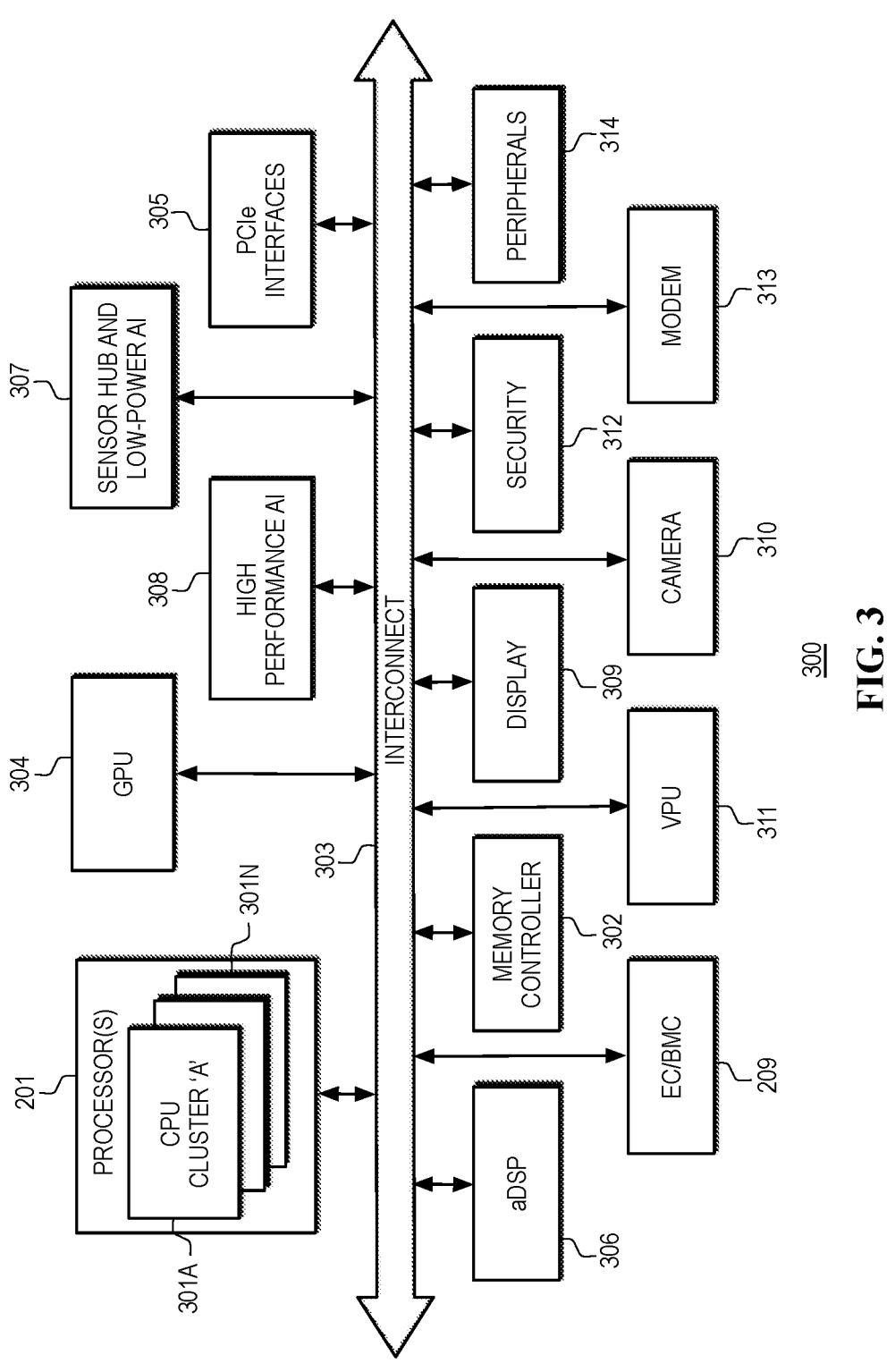
FIG. 3 is a diagram illustrating an example of a heterogenous computing platform, according to some embodiments.

FIG. 2 is a block diagram of components of IHS 200, which may be used to implement any of managed IHSs 101A-N, third-party IHS 106, ITDM/OEM server 102, and/or third-party server 105 in FIG. 1. As depicted, IHS 200 includes processor(s) 201. In various embodiments, IHS 200 may be a single-processor system, or a multi-processor system including two or more processors. Processor(s) 201 may include any processor capable of executing program instructions, such as a PENTIUM processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 200 includes chipset 202 coupled to processor(s) 201. Chipset 202 may provide processor 201 with access to several resources. In some cases, chipset 202 may utilize a QuickPath Interconnect (QPI) bus to communicate with processor(s) 201. Chipset 202 may also be coupled to communication interface(s) 205 to enable communications between IHS 200 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like. In some cases, communication interface(s) 205 may be used to communicate with devices (e.g., BT speakers, microphones, headsets, etc.). Moreover, communication interface(s) 205 may be coupled to chipset 202 via a Peripheral Component Interconnect Express (PCIe) bus or the like.

Chipset 202 may be coupled to display and/or touchscreen controller(s) 204, which may include one or more or Graphics Processor Units (GPUs) on a graphics bus, such as an Accelerated Graphics Port (AGP) or PCIe bus. As shown, display controller(s) 204 provide video or display signals to one or more display device(s) 211.

Display device(s) 211 may include Liquid Crystal Display (LCD), Light Emitting Diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, rather than two discrete displays.

Chipset 202 may provide processor(s) 201 and/or display controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like. System memory 203 may store program instructions that, upon execution by processor(s) 201, enable a collaboration mode for a touchpad coupled to or integrated into IHS 200.

In certain embodiments, chipset 202 may also provide access to one or more Universal Serial Bus (USB) ports 208, to which one or more peripheral devices may be coupled (e.g., integrated or external webcams, microphones, speakers, etc.). Chipset 202 may provide access to one or more hard disk drives, solid-state drives, optical drives, or other removable-media drives.

Chipset 202 may further provide access to one or more user input devices 206, for example, using a super I/O controller or the like. Examples of user input devices 206 include, but are not limited to, a keyboard, mouse, touchpad, stylus or active pen, totem, etc. Each of user input devices 206 may include a respective controller (e.g., a touchpad may have its own touchpad controller) that interfaces with chipset 202 through a wired or wireless connection (e.g., via communication interfaces(s) 205).

In certain embodiments, chipset 202 may also provide an interface for communications with one or more hardware sensors 210. Sensors 210 may be disposed on or within the chassis of IHS 200, or otherwise coupled to IHS 200, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 200, processor(s) 201 may utilize program instructions of Basic Input/Output System (BIOS) 207 to initialize and test hardware components coupled to IHS 200 and to load an OS for use by IHS 200. BIOS 207 provides an abstraction layer that allows the OS to interface with certain hardware components that are utilized by IHS 200. Via the hardware abstraction layer provided by BIOS 207, software stored in system memory 203 and executed by processor(s) 201 can interface with certain I/O devices that are coupled to IHS 200. The Unified Extensible Firmware Interface (UEFI) was designed as a successor to BIOS. As a result, many modern IHSs utilize UEFI in addition to or instead of a BIOS. As used herein, BIOS 207 is intended to also encompass a UEFI component.

Embedded Controller (EC) or Baseboard Management Controller (BMC) 209 is operational from the very start of each IHS power reset and it handles various tasks not ordinarily handled by processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing the battery charger and the battery, allowing remote diagnostics and remediation over network(s) 103, etc.

For example, EC/BMC 209 may implement operations for interfacing with a power adapter in managing power for IHS 200. Such operations may be utilized to determine the power status of IHS 200, such as whether IHS 200 is operating from battery power or is plugged into an AC power source. Firmware instructions utilized by EC/BMC 209 may be used to provide various core operations of IHS 200, such as power management and management of certain modes of IHS 200 (e.g., turbo modes, maximum operating clock frequencies of certain components, etc.).

EC/BMC 209 may also implement operations for detecting certain changes to the physical configuration or posture of IHS 200 and managing other devices in different configurations of IHS 200. For instance, when IHS 200 as a 2-in-1 laptop/tablet form factor, EC/BMC 209 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some cases, EC/BMC 209 may be configured to identify any number of IHS postures, including, but not limited to: laptop, stand, tablet, or book. For example, when display(s) 211 of IHS 200 is open with respect to a horizontal keyboard portion, and the keyboard is facing up, EC/BMC 209 may determine IHS 200 to be in a laptop posture. When display(s) 211 of IHS 200 is open with respect to the horizontal keyboard portion, but the keyboard is facing down (e.g., its keys are against the top surface of a table), EC/BMC 209 may determine IHS 200 to be in a stand posture. When the back of display(s) 211 is closed against the back of the keyboard portion, EC/BMC 209 may determine IHS 200 to be in a tablet posture. When IHS 200 has two display(s) 211 open side-by-side, EC/BMC 209 may determine IHS 200 to be in a book posture. In some implementations, EC/BMC 209 may also determine if display(s) 211 of IHS 200 are in a landscape or portrait orientation.

In some cases, EC/BMC 209 may be installed as a Trusted Execution Environment (TEE) component to the motherboard of IHS 200. Additionally, or alternatively, EC/BMC 209 may be further configured to calculate hashes or signatures that uniquely identify individual components of IHS 200. In such scenarios, EC/BMC 209 may calculate a hash value based on the configuration of a hardware and/or software component coupled to IHS 200. For instance, EC/BMC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC/BMC 209 may later recalculate the hash value for a component may compare it against the reference hash value to determine if any modifications have been made to the component, thus indicating that the component has been compromised. In this manner, EC/BMC 209 may validate the integrity of hardware and software components installed in IHS 200.

In other embodiments, IHS 200 may not include all the components shown in FIG. 1. In other embodiments, IHS 200 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, processor(s) 201 and/or other components shown in FIG. 2 (e.g., chipset 202, display controller 204, communication interfaces 205, EC/BMC 209, etc.) may be replaced by heterogenous computing platform 300 of FIG. 3. As such, IHS 200 may assume different form factors including, but not limited to: servers, workstations, desktops, laptops, appliances, video game consoles, tablets, smartphones, etc.

FIG. 3 is a diagram illustrating an example of heterogenous computing platform 300. Platform 300 may be implemented in an SoC, FPGA, ASIC, or the like. Platform 300 includes a plurality of segregated devices, each device having a different set of processing capabilities suitable for handling a particular type of computational task. Because each device in platform 300 only executes the types of computational tasks it was specifically designed to execute, the overall power consumption of platform 300 is reduced.

In various implementations, each device in platform 300 may include its own microcontroller(s) or core(s) (e.g., ARM core(s)) and corresponding firmware. In some cases, a device in platform 300 may also include its own hardware-embedded accelerator (e.g., a secondary or co-processing core coupled to a main core). Each device in platform 300 may be accessible through a respective Application Programming Interface (API). Additionally, or alternatively, each device in platform 300 may execute its own OS. Additionally, or alternatively, one or more of these devices may be a virtual device.

In certain embodiments, at least one device in platform 300 may have updatable firmware which, upon installation, operates to change the performance, available features, settings, configuration options, API, drivers, and/or services provided by that device. For example, each update may be delivered to platform 300 as a system-wide firmware installation package having a plurality of firmware components, and each firmware component may be distributed to its respective device (or corresponding memory space). In some implementations, the latest system-wide firmware installation package received by platform 300 may be installed at every boot of IHS 200.

In the example of FIG. 3, platform 300 includes CPU clusters 301A-N as an implementation of processor(s) 201 intended to perform general-purpose computing operations. Each of CPU clusters 301A-N may include, for instance, a plurality or processing cores and a cache memory. In operation, CPU clusters 301A-N are available and accessible to the IHS's host OS 400 (e.g., WINDOWS on ARM), collaboration application(s) 412 (FIG. 4), OS agent(s) 413, and other application(s) 414 executed by IHS 200.

CPU clusters 301A-N are coupled to memory controller 302 via main bus or interconnect 303. Memory controller 302 is responsible for managing memory accesses for all of devices connected to interconnect 303, and interconnect 303 may include any communication bus suitable for inter-device communications within an SoC (e.g., Advanced Microcontroller Bus Architecture or "AMBA," QuickPath Interconnect or "QPI," HyperTransport or "HT," etc.). All devices coupled to interconnect 303 can communicate with each other and with a host OS executed by CPU clusters 301A-N through interconnect 303.

GPU 304 is a device designed to produce graphical or visual content and to communicate that content to a monitor or display, where the content may be rendered. PCIe interfaces 305 provide an entry point into any additional devices external to platform 300 that have a respective PCIe interface (e.g., graphics cards, USB controllers, etc.).

Audio Digital Signal Processor (aDSP) 306 is a device designed to perform audio and speech operations and to perform in-line enhancements for audio input(s) and output(s). Examples of audio and speech operations include, but are not limited to: noise cancellation, echo cancellation, directional audio detection, wake word detection, muting and volume control, filters and effects, etc.

In operation, input and/or output audio streams may pass through and be processed by aDSP 306, which can send the processed audio to other devices on interconnect 303 (e.g., CPU clusters 301A-N). aDSP 306 may also be configured to process one or more of platform 300's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.), for instance, under control of sensor hub and low-power Artificial Intelligence (AI) device 307.

Figure 6:
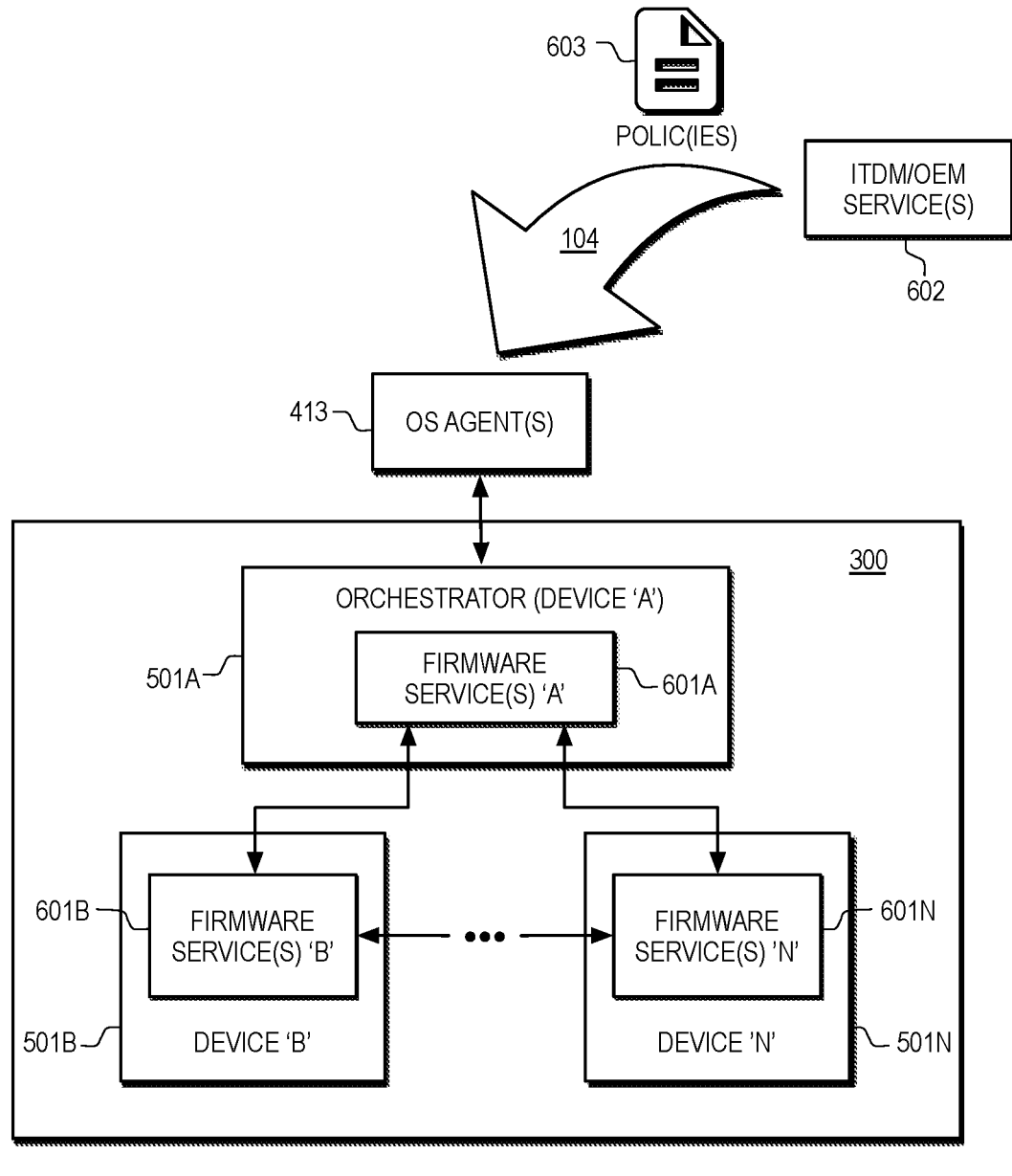
FIG. 6 is a diagram illustrating an example of an orchestrator system where an orchestrator device is configured to manage other devices in a heterogenous computing platform, according to some embodiments.

Sensor hub and low-power AI device 307 is a very low power, always-on device designed to consolidate information received from other devices in platform 300, process any contextual data streams, and provide that information to: (i) a host OS, (ii) other applications, and/or (ii) other devices in platform 300. For example, sensor hub and low-power AI device 307 may include general-purpose input/output (GPIOs) that provide Inter-Integrated Circuit (I²C), Serial Peripheral Interface (SPI), and/or serial interfaces to receive data from sensors (e.g., sensors 210, camera 310, peripherals 314, etc.). Sensor hub and low-power AI device 307 may also include an always-on, low-power processing core configured to execute smaller neural networks and specific applications, such as contextual awareness and audio enhancements. In some embodiments, sensor hub and low-power AI device 307 may be configured to operate as orchestrator 501A (FIG. 6).

High-performance AI device 308 is a significantly more powerful processing device than sensor hub and low-power AI device 307, and it may be designed to execute multiple complex AI algorithms and models concurrently (e.g., Natural Language Processing, speech recognition, speech-to-text transcription, video processing, gesture recognition, level of engagement determinations, etc.). For example, high-performance AI device 308 may include a Neural Processing Unit (NPU), Tensor Processing Unit (TSU), Neural Network Processor (NNP), or Intelligence Processing Unit (IPU), and it may be designed specifically for AI and Machine Learning (ML), which speeds up the processing of AI/ML tasks while also freeing processor 201 to perform other tasks.

Display/graphics device 309 is designed to perform additional video enhancement operations. In operation, display/graphics device 309 may provide a video signal to an external display coupled to IHS 200 (e.g., display device(s) 211).

Camera device 310 includes an Image Signal Processor (ISP) configured to receive and process video frames captured by a camera coupled to platform 300 (e.g., in the visible and/or infrared spectrum).

Video Processing Unit (VPU) 311 is a device designed to perform hardware video encoding and decoding operations, thus accelerating the operation of camera 310 and display/graphics device 309. VPU 311 may be configured to provide optimized communications with camera device 310 for performance improvements.

In some cases, devices 309-311 may be coupled to main interconnect 303 via a secondary interconnect (not shown). A secondary interconnect may include any bus suitable for inter-device and/or inter-bus communications within an SoC.

Security device 312 includes any suitable security device, such as a dedicated security processor, a Trusted Platform Module (TPM), a TRUSTZONE device, a PLUTON processor, or the like. In various implementations, security device 312 may be used to perform cryptography operations (e.g., generation of key pairs, validation of digital certificates, etc.) and/or it may serve as a hardware root-of-trust (RoT) for heterogenous computing platform 300 and/or IHS 200.

Modem and wireless controller 313 is a device designed to enable all wireless communications in any suitable frequency band (e.g., Bluetooth, WiFi, 5G, etc.), subject to AI-powered optimizations for improved speeds, reliability, and/or coverage.

Peripherals 314 may include all other devices coupled to platform 300 (e.g., sensors 210) through mechanisms other than PCIe interfaces 305. In some cases, peripherals 314 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 200.

In some cases, devices 312-313 may be coupled to main interconnect 303 via the same secondary interconnect serving devices 309-311 (not shown). Additionally, or alternatively, devices 312-313 may be coupled to main interconnect 303 via another secondary interconnect.

EC/BMC 209 is designed to enable management operations of IHS 200, similarly as described with respect to FIG. 2, but here integrated into platform 300 as yet another SoC device. To that end, EC/BMC 209 may be operational from the very start of each SoC power reset, before other devices such as CPU clusters 301A-N or sensor hub and low-power AI device 307 are fully running or powered on.

EC/BMC 209 may also provide an out-of-band (00B) channel that serves as management channel 104 of FIG. 1. In some cases, EC/BMC 209 may be external to SoC platform 300 and coupled thereto via a high-speed interface (e.g., enhanced SPI or "eSPI"). In other cases, EC/BMC 209 may be configured to operate as orchestrator 501A (FIG. 6).

In many cases, one or more of the devices of heterogeneous computing platform 300 may be configured to execute one or more AI model(s). In various embodiments, such AI model(s) may implement: a neural network (e.g., artificial neural network, deep neural network, convolutional neural network, recurrent neural network, autoencoders, reinforcement learning, etc.), fuzzy logic, deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of available AI algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearn-Toolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEU-RALDESIGNER, Theano Generalized Hebbian Learning, Apache SINGA, Lightnet, and SimpleDNN.

Figure 4:
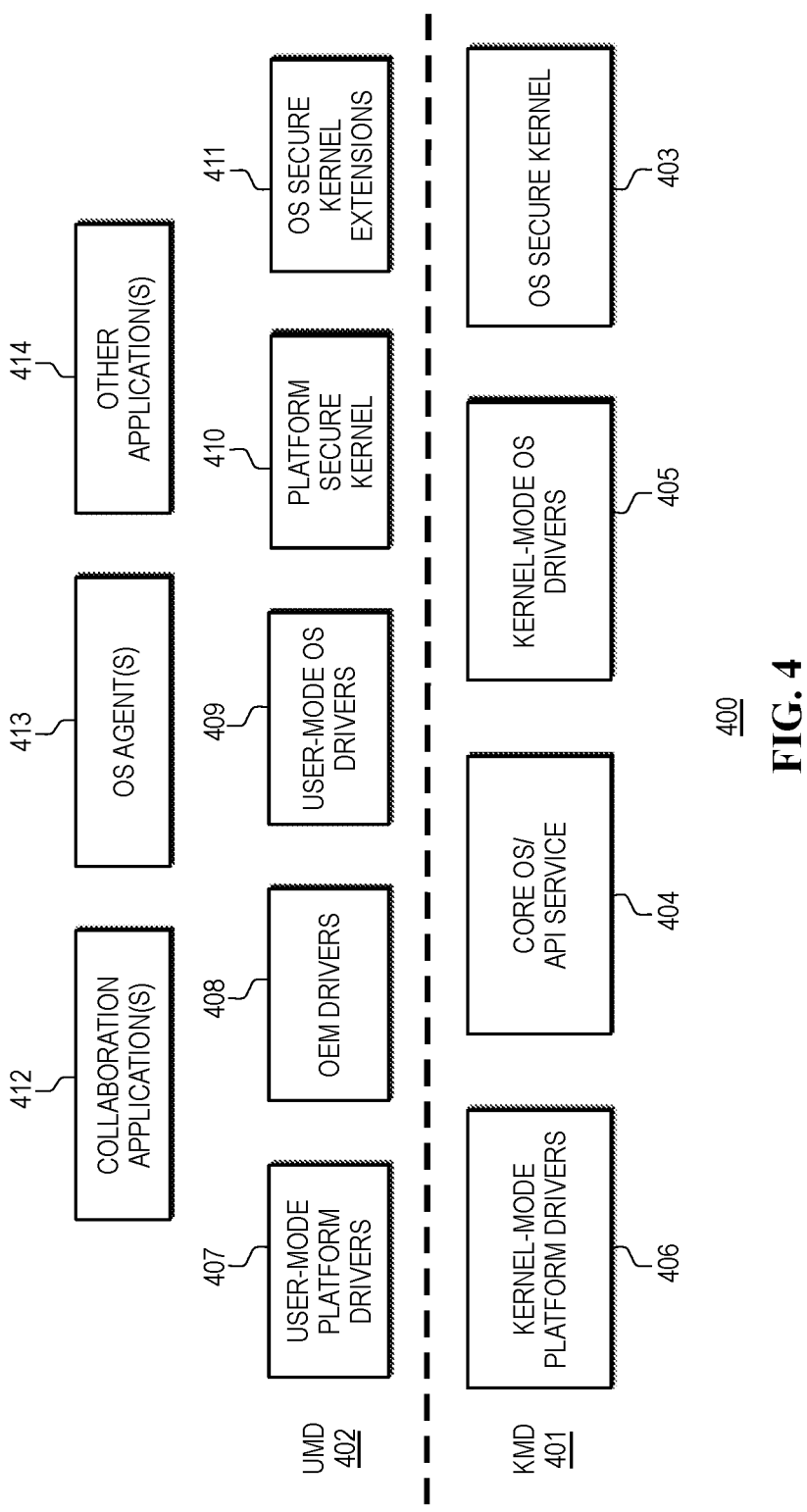
FIG. 4 is a diagram illustrating an example of a host Operating System (OS) executable by a heterogenous computing platform, according to some embodiments.

FIG. 4 is a diagram illustrating an example of host OS 400 executable by CPU clusters 301A-N of heterogenous computing platform 300. In some cases, host OS 400 may be implemented as WINDOWS on ARM. As shown, host OS 400's stack includes kernel mode drivers (KMD) in kernel space 401 and user mode drivers (UMD) in user space 402.

In kernel space 401, OS secure kernel 403 is responsible for secure operations (e.g., encryption, validation, etc.) within IHS 200. Core OS/API service 404 has direct access to IHS components 200 such as, for example, heterogenous computing platform 300. OS drivers 405 include kernel mode drivers developed by the OS publisher or other developer. Platform drivers 406 include kernel mode drivers developed by the manufacturer of heterogenous computing platform 300, for example, for use with devices 304-315.

In user space 402, user-mode platform drivers and services 407 enable access to features provided by devices 304-315 through kernel-mode platform drivers 406. OEM drivers 408 enable features in OEM devices coupled to IHS 200, and user-mode OS drivers and services 409 enable access to OS features through kernel mode OS drivers 405. Platform secure kernel 410 includes protected user-mode portions of host OS 400 developed by the manufacturer of heterogenous computing platform 300, and OS secure kernel extensions 411 include extensions to protected user-mode portions of host OS 400 developed by the OS publisher or other developer.

Collaboration application 412 may include any video and/or audio teleconferencing software client or program (e.g., ZOOM, TEAMS, SKYPE, etc.) that enables users of participating IHSs 101A-N and/or 104 to engage in remote meetings or sessions over network(s) 103. Additionally, or alternatively, collaboration application 412 may enable IHS 101A-N to establish collaboration sessions over peer-to-peer (P2P) connections. In some cases, collaboration application 412 may provide features such as: group and 1:1 voice and video calls, virtually raise a hand during a meeting, premade and custom virtual backgrounds, ability to record meetings, breakout rooms, join or host meetings from any IHS, screen sharing, guest access, whiteboarding tools, annotations, speech-to-text, live transcript, speaker identification, noise and echo cancellation, etc.

OS agent(s) 413 may include an OS agent or client configured to communicate with service(s) provided by ITDM/OEM server 102 to establish an in-band management channel 104. Moreover, other applications 414 may include any non-collaboration workload executable by heterogenous computing platform 300. For example, other applications 414 may include an optimization, management, productivity, or multimedia application executable by host OS 400.

At least one of applications 412-414 may be configured to utilize one or more devices, features, or services exposed, surfaced, enumerated, or otherwise made available by user-mode drivers 407-409, for example, through a Human Interface Device (HID) interface and/or an HID report provided by host OS 400, or the like. Additionally, or alternatively, one or more of applications 412-414 may operate as orchestrator 501A (FIG. 6).

In some cases, host OS 400 may be configured to receive a firmware installation package or executable file containing at least one extension driver from ITDM/OEM server 102 via management channel 104. The installation package may be processed by a UEFI UpdateCapsule process when distributed as part of an OS update, as a system-wide and/or device-specific firmware update, and/or it may be distributed by OEM update applications such as DELL COMMAND UPDATE, integrated with remote deployment and update management tools. Firmware components of each extension driver may be loaded, attached, or extended onto user-mode platform drivers and services 407, and may be communicated by user-mode platform drivers and services 407 to respective ones of devices 304-315 of heterogenous computing platform 300 through kernel-mode platform drivers 406 for installation, update, or execution of such firmware components in those devices.

As such, the deployment of extension drivers by host OS 400 as OEM drivers 408 provides value-added features or services to user-mode platform drivers (e.g., base drivers) 407 and/or applications 412-414. Particularly, OEM drivers 408 may expose custom services and routines provided by any one of devices 304-315 upon execution of their corresponding firmware components. In some cases, OEM driver 408 may also operate as orchestrator 501A (FIG. 6).

Figure 5:
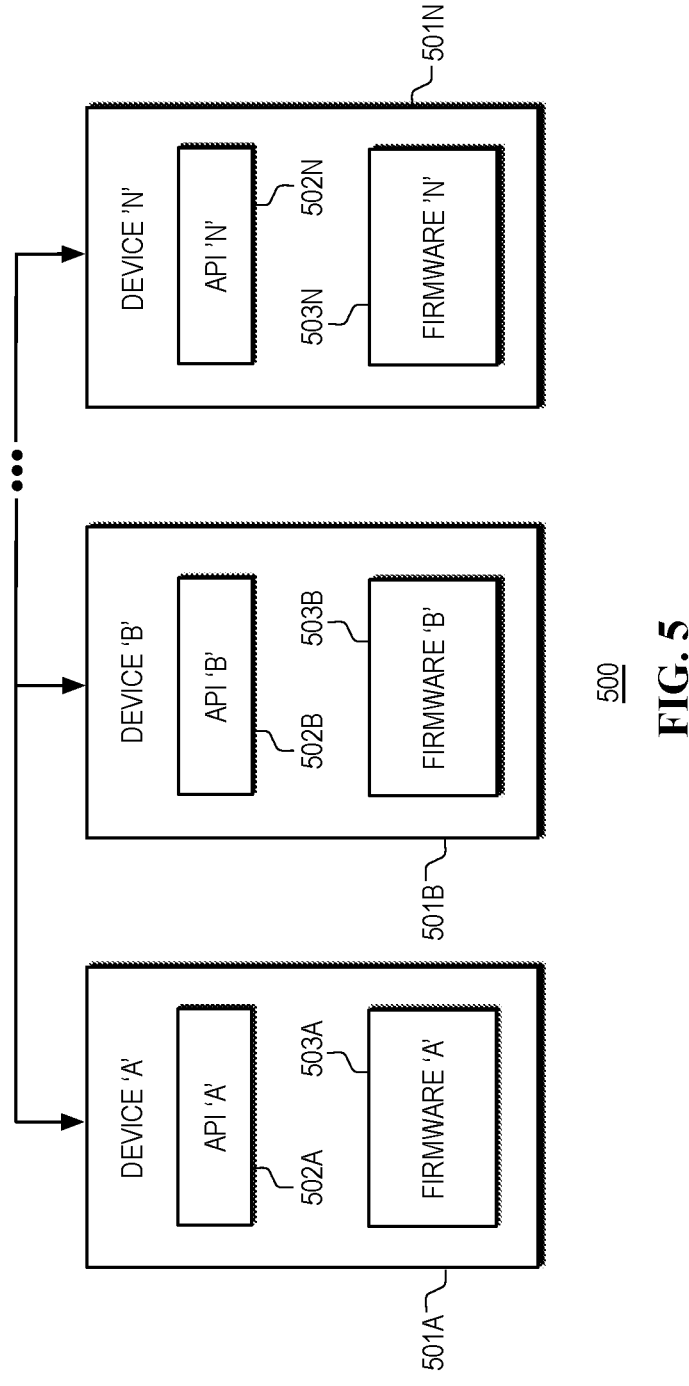
FIG. 5 is a diagram illustrating an example of host OS-independent, autonomous inter-device communications in a heterogenous computing platform, according to some embodiments.

FIG. 5 is a diagram illustrating an example of host OS-independent, autonomous inter-device communications 500 in heterogenous computing platform 300. Particularly, devices 501A-N may implement any of devices 304-315 of heterogenous computing platform 300.

Each of APIs 502A-N provides access to firmware 503A-N executed by a corresponding device 501A-N. In operation, each firmware component 503A-N may exchange data and commands directly with each other using APIs 502A-N. Through APIs 502A-N, one or more of devices 501A-N may be configured to enable, disable, or modify firmware services provided by other devices 503A-N. For example, in some embodiments, one or more of devices 501A-N may be designated as orchestrator 501A (FIG. 6).

In various embodiments, firmware services resulting from the execution of firmware 503A-N may be provided by their respective device 501A-N to other devices 501A-N within heterogeneous computing platform 300 autonomously and/ or independently of the operation of host OS 400. Communications between executing firmware 503A-N and applications 412-414 may take place through OEM drivers 408. In some cases, executing firmware 503A-N may be identified by or exposed to host OS 400 and/or applications 412-414 as part of Human Interface Device (HID) reports.

Firmware 503A-N and corresponding OEM drivers 408 may be installed, modified, updated, and/or removed from IHS 200 upon each installation of a system-wide firmware installation package for the entire heterogenous computing platform 300, for example, at each boot of IHS 200, thus providing additional controls over the management, deployment, customization, and/or configuration of IHS 200 to the ITDM or OEM that are independent of updates to host OS 400 and/or applications 412-414.

In other embodiments, however, any given one of devices 501A-N may be rebooted or reset independently of the other devices to perform a local installation, update, or modification of that given device's firmware 503A-N without having to reboot the entire heterogenous computing platform 300 and/or IHS 200. Additionally, or alternatively, one or more of devices 501A-N may have its firmware 503A-N at least partially installed or updated without rebooting or resetting that device.

FIG. 6 is a diagram illustrating an example of orchestration system 600 where orchestrator 501A (e.g., device 'A') is configured to manage other devices 501B-N (e.g., devices 304-315) of heterogenous computing platform 300 of IHS 200. In some embodiments, orchestrator 501A may be implemented as one of applications 412-414, one of OEM drivers 408, sensor hub and low-power AI device 307 and/or its firmware service(s), EC/BMC 209 and/or its firmware service(s), or any suitable combination thereof.

Orchestrator 501A may be configured to provide firmware service(s) 601A through the execution of firmware 503A. Similarly, each of devices 501B-N may be configured to provide their own firmware service(s) 601B-N through the execution of firmware 503B-N. Each of firmware services 601A-N may operate independently of host OS 400.

Firmware service(s) 601A of orchestrator 501A may be configured to facilitate indirect communication of data, commands, AI models, scripts, and/or routines among firmware services 601B-N of devices 601B-N via APIs 502B-N. Additionally, or alternatively, firmware services 601B-N may exchange data and commands directly with each other using APIs 502B-N.

Orchestrator 501A may be configured to operate a plurality of devices 501B-N and to receive contextual information and telemetry data therefrom. In this manner, orchestrator 501A may be configured to allow IHS users, ITDMs, and/or OEMs to manage, deploy, customize, and/or configure IHS 200 and/or applications 412-414.

In various embodiments, systems and methods described herein may enable an ITDM or OEM to manage, deploy, customize, and/or configure aspects of collaboration sessions established using one or more application(s) 412 through orchestrator 501A. For example, ITDM/OEM service(s) 602 may provide one or more devices 501A-N of heterogeneous computing platform 300 with firmware components 503A-N that, upon execution by their respective devices, add, remove, or modify collaboration services (e.g., video and/or audio) accessible to one or more collaboration application(s) 412 during a collaboration session based upon contextual information and/or telemetry data.

Particularly, orchestrator 501A may receive message(s), file(s), command(s), script(s), or polic(ies) 603 (e.g., an Extensible Markup Language or "XML", a JavaScript Object Notation or "JSON" file, etc.) from ITDM/OEM service 602 through OS agent(s) 413 (i.e., in-band). (When management channel 104 is an OOB channel between EC/BMC 209 and ITDM/OEM service(s) 602, OS agent(s) 413 may be replaced with EC/BMC 209.)

In some cases, OS agent 413 may also receive one or more AI models and/or AI model parameters for use by a device within platform 300, such as high-performance AI device 308 and/or sensor hub and low-power AI device 307. These AI models and parameters may be provided to OS agent 413 by ITDM/OEM service 602 or by third-party server 105.

Polic(ies) 603 may contain commands, program instructions, routines, and/or rules that conform to APIs 502A-N. Alternatively, or alternatively, orchestrator 501A may interpret polic(ies) 603 and issue commands following APIs 502A-N. Using APIs 502B-N, orchestrator 501A may be configured to enable, disable, or modify firmware services 601B-N based upon instructions conveyed in polic(ies) 603 (e.g., in response to changes in context, telemetry, etc.) without the involvement of host OS 400.

For example, based upon polic(ies) 603, orchestrator 501A may install, update, modify, enable or disable any of firmware services 602B-N in each of devices 501B-N in response to one or more of: an IHS location, an IHS posture (e.g., lid closed, etc.), an IHS identification (e.g., service tag, serial number, etc.), a type of IHS (e.g., manufacturer, model, etc.), an identification or type of heterogenous computing platform 300, an IHS battery (dis)charge level or rate, an identity or type of connected or available IHS peripherals, a security posture of IHS 200 (e.g., connected to VPN, disposed in a trusted or secure location, etc.), an identity or type of applications 412-414 executed by host OS 400, an identity or type of one of applications 412-414 requesting firmware services 601A-N (e.g., via OEM driver 408), an identification of a user of the IHS, an identification of a user group or role, a user's proximity to the IHS, a user's level of user engagement, detected onlooker(s), a user's personal information (e.g., languages spoken, video or audio preferences, etc.), calendar events or data (e.g., type, time, and duration of a collaboration session, priority or importance of the session, role of the user in the session, recurring status, identities and roles of other participants in the session, etc.), messaging (e.g., email, text messages, etc.) data (e.g., subject, date sent and received, number of related messages, priority, names and roles of addressees, etc.), environmental conditions (e.g., weather, background noise levels, lighting level or quality, etc.), etc.

Examples of contextual information accessible by orchestrator 501A may include, but are not limited to: a type of audio environment indicative of the types of sounds being produced and/or likely to be produced near the user (e.g., indoors, outdoors, home, office, restaurant, car, airport, airplane, etc.), gyroscope data (e.g., an indication of an angular velocity, for example, in mV/deg/s), accelerometer data (e.g., an indication of a linear acceleration, for example, in mV/g), a Global Positioning System (GPS) or wireless network location of IHS 200, Red-Green-Blue (RGB) image data, infrared (IR) image data, eye-gaze data, audio data, an indication of a geographic location of IHS 200, characteristics of a network or radio system (e.g., WiFi vs. 5G, bandwidth, latency, errors, etc.) used by IHS 200, keyboard, mice, trackpad, or trackball usage data, a battery level of IHS 200, a level of utilization of high-performance AI device 308 and/or sensor hub and low-power AI device 307, an indication of whether a collaboration application is currently being executed by processor 201, a role of the user in a current collaboration session (e.g., speaker, presenter, or host versus listener, attendee, or participant), a language preference of the user, a time zone, a location of the current collaboration session, an indication of an upcoming collaboration session, a role of the user in the upcoming collaboration session, a location of the upcoming collaboration session, a calendar event, an indication of any application or type of application executed by processor 201, etc.

In some cases, polic(ies) 603 may specify that orchestrator 501A select one or more of a plurality of different AI models to be used for a given operation in response to the IHS being at a certain geographic location, network location, type of audio environment, etc. Any of the contextual information described herein may be used to create different sets of conditions for rules outlined in polic(ies) 603.

For example, polic(ies) 603 may specify that high-performance AI device 308 be used to apply a more computationally costly AI model (or a larger number of models) under a favorable set of conditions (e.g., if battery level is above a first threshold level, if IHS 200 is connected to AC power, if a certain application or type of application is in execution, if a level of utilization of high-performance AI device 308 and/or sensor hub and low-power AI device 307 is below a threshold level, etc.). Under a set of less favorable conditions (e.g., if battery level is below a second threshold level, if a certain application or type of application is not in execution, if a level of utilization of high-performance AI device 308 is above a threshold level, etc.), however, polic(ies) 603 may specify that sensor hub and low-power AI device 307 be used to apply a less computationally costly AI model (or fewer models).

In some cases, polic(ies) 603 may also determine whether or under what conditions the user many manually override its rules and settings (e.g., turn a camera or microphone on or off, enable or disable a filter or effect, etc.). Moreover, for different types of users (e.g., engineer, customer support, executive, etc.) who tend to interact with their IHSs 101A-N in different ways, ITDM/OEM service(s) 602 may deploy different rules, AI models, and/or parameters by deploying different polic(ies) 603.

Firmware services 601A-N and corresponding OEM drivers 408 may be installed, modified, updated, and/or removed from IHS 200 upon each installation of a system-wide firmware installation package for the entire heterogenous computing platform 300, for example, at each boot of IHS 200. For example, each firmware component 503A-N providing a respective firmware service 601A-N may be delivered to a respective device 501A-N as an extension driver. Upon execution, firmware services 601A-N may provide additional controls over the management, deployment, customization, and/or configuration of IHS 200 to the ITDM or OEM that are independent of updates to host OS 400 and/or applications 412-414.

In other embodiments, any given one of devices 501A-N may be rebooted or reset independently of the other devices to perform a local installation, update, or modification of that given device's firmware services 601A-N without having to reboot the entire heterogenous computing platform 300 and/or IHS 200. Additionally, or alternatively, one or more of devices 501A-N may have its firmware service 601A-N at least partially installed or updated without rebooting or resetting the device.

In various embodiments, systems and methods described herein may enable orchestrator 501A to characterize workloads executed by heterogenous computing platform 300, including the detection of collaboration sessions.

Figure 7:
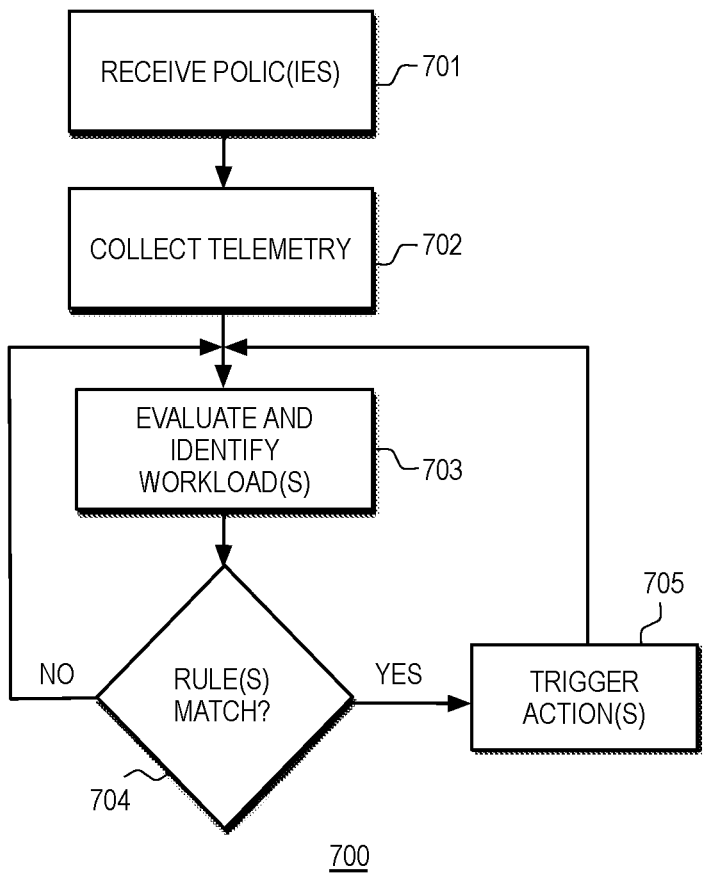
FIG. 7 is a flowchart illustrating an example of a method for detecting collaboration sessions and other workloads in a heterogenous computing platform, according to some embodiments.

In that regard, FIG. 7 is a flowchart illustrating an example of method 700 for detecting collaboration sessions and other workloads in heterogenous computing platform 300. In various embodiments, method 700 may be performed, at least in part, by orchestrator 501A. Particularly, at 701, orchestrator 501A may receive polic(ies) 603. Polic(ies) 603 may include rules and/or parameters usable by orchestrator 501A to effect and/or manage workload characterization operations autonomously and/or independently of host OS 400.

In some cases, polic(ies) 603 may include an indication of one or more of: selected one(s) of the plurality of devices to collect telemetry from, a workload characterization model to be executed, a device to execute the model, the telemetry data to be collected, telemetry collection parameters (e.g., collection frequency, collection start and end times, duration of collection, a maximum amount of telemetry data to be collected, etc.), a resource allocation operation (e.g., to be performed if a collaboration session is detected), a resource reallocation operation (e.g., to be performed when a collaboration session ends), etc. One or more of these parameters may be dynamically selected by orchestrator 501A based upon contextual information as outlined in polic(ies) 603.

At 702, orchestrator 501A may collect telemetry from one or more of devices 501B-N, for example, as prescribed by polic(ies) 603. Devices 501B-N may include, for instance: aDSP 306, camera 310, VPU 311, modem 313, etc. Furthermore, examples of telemetry data include, but are not limited to: core utilization metrics, memory utilization metrics, network utilization metrics, battery utilization metrics, etc.

Figure 8:
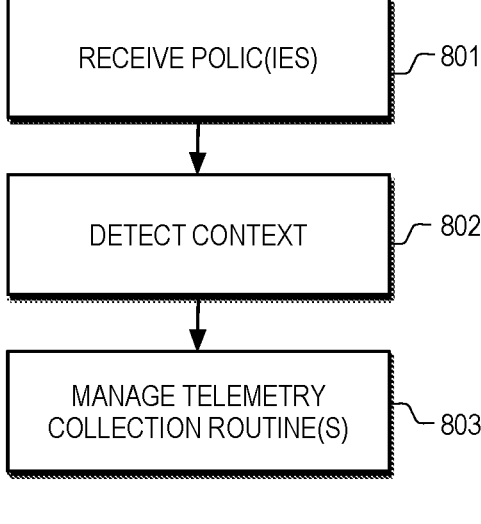
FIG. 8 is a flowchart illustrating an example of a method for managing telemetry services in a heterogenous computing platform, according to some embodiments.

To collect the telemetry, orchestrator 501A may send a message to a firmware services 601B-N provided by devices 502B-N without any involvement by host OS 400. Additional aspects of telemetry collection are discussed below in method 800 (FIG. 8).

At 703, orchestrator 501A may evaluate, characterize, and/or identify a workload. For example, orchestrator 501A may execute a workload characterization model using the telemetry. A workload characterization model may include an AI model trained to receive telemetry data as inputs and to identify one or more workloads (or types of workloads) in execution.

In some cases, a workload characterization model may identify patterns of utilization (e.g., core, memory, network) by certain devices 501A-N that are indicative of an ongoing collaboration session. Additionally, or alternatively, a workload characterization model may identify patterns of utilization of other types of workloads (e.g., productivity applications, web browsers, video games, etc.).

In some implementations, orchestrator 501A may request that another device evaluate, characterize, and/or identify the workload. Orchestrator 501A may send a message to a firmware service provided by a selected device (e.g., High-Performance AI device 308), without any involvement by host OS 400, to execute a workload characterization model based on the telemetry data.

At 704, orchestrator 501A determines if a rule in polic(ies) 603 is matched. If not, method 700 returns to 703. Otherwise, at 705, orchestrator 501A may perform one or more responsive actions before returning to 703. For example, polic(ies) 603 may require that, upon detection, orchestrator 501A notify host OS 400 and/or applications 412-414 of the start and/or end of a collaboration session.

Additionally, or alternatively, polic(ies) 603 may require that, upon detection of a collaboration session, a resource allocation operation be performed (e.g., to prioritize the collaboration session over other workloads) among devices 501A-N and/or within any given one of devices 501A-N. When the collaboration session is no longer detected at 703, a resource reallocation operation may be performed to return heterogenous computing platform 300 to a default state. These resource allocation and reallocation operations, and any parameters thereof, may be selected based on contextual rules outlined in polic(ies) 603.

In some embodiments, execution of method 700 may be required by polic(ies) 603 based on current context of IHS 200. Particularly, the identification of the beginning and/or ending of a collaboration session or other workload, as described herein, may be performed (or not) based upon certain contextual information being detected, as outlined in polic(ies) 603.

FIG. 8 is a flowchart illustrating an example of method 800 for managing telemetry services in heterogenous computing platform 300. In various embodiments, method 800 may be performed, at least in part, by orchestrator 501A. Particularly, at 801, orchestrator 501A may receive polic (ies) 603.

Polic(ies) 603 may include rules and/or parameters usable by orchestrator 501A to effect and/or manage telemetry collection operations autonomously and/or independently of host OS 400. For example, polic(ies) 603 may identify one or more of: telemetry data to be collected, devices to collect the telemetry data from, telemetry collection parameters, telemetry collection routines, etc. The telemetry data may include common clock time stamps and defined depth of telemetry, as requested by polic(ies) 603.

Moreover, polic(ies) 603 may include one or more contextual rules that associate changes in contextual information with changes in telemetry data to be collected, devices to collect the telemetry data from, telemetry collection parameters, telemetry collection routines, etc.

At 802, orchestrator 501A may detect contextual information from devices 501A-N. Then, at 803, orchestrator 501 may manage the distribution and/or operation of one or more telemetry collection routines executable by one or more of devices 501A-N based upon the contextual information, as prescribed by polic(ies) 603. In some implementations, orchestrator 501A may also be configured to perform a resource allocation operation (e.g., to prioritize the execution of a collaboration session over other workloads) based, at least in part, upon an evaluation of the telemetry data against polic(ies) 603.

In some implementations, method 800 may be performed by orchestrator 501A at the request of applications 412-414. By maintaining all telemetry collection routines in firmware 503A-N, method 800 addresses problems associated with the excessive consumption of IHS resources by OS-level telemetry collection software. In some cases, orchestrator 501A may serve as the only point of contact for all telemetry requests targeting devices 501A-N, and it may output a stream of telemetry data to host OS 400.

During a collaboration session, situations may arise where profanities are uttered by one or more participants (or non-participants near IHS 200) or otherwise shared (e.g., content or video sharing) among participants. The term "profanity," as used herein, refers generally to the purposeful or inadvertent use of blasphemous or obscene language or speech. Examples of profanities may include curse words, cuss words, swearing, obscenities, expletives, four-letter words, dirty language, hate words, or any other words known to socially offend others and/or create unproductive collaboration sessions.

Whether any given word is considered to be a profanity may depend on a number of factors, including, but not limited to: the context of the collaboration session (e.g., the topic of the session, the time-of-day when the session is taking place, etc.), the participants of the collaboration session (e.g., their age, gender, ethnicity, etc.), the location of those participants, whether the collaboration session is being broadcast to persons other than the participants and who those persons are (again, their age, gender, ethnicity, etc.), current news stories, and so on. Moreover, what constitutes a profanity may also be dictated by company/ITDM policy.

In various embodiments systems and methods for filtering profanities during a collaboration session in heterogenous computing platform 300 are described. In some implementations, systems and methods described herein may determine when or whether to apply profanity filtering to a collaboration session based upon contextual and/or telemetry data.

In some implementations, profanity filtering may be achieved by performing the following operations: (i) receiving an audio stream from a local participant; (ii) receiving a combined audio stream from one or more remote participants; (iii) separating speech or utterances produced by different participants of the collaboration session into individual audio streams; (iv) detecting profanities in each audio stream via application of speech recognition and/or profanity filter model(s) configured to identify profane content based upon a match obtained as a result of a comparison between the audio streams and a set of profanity audio signatures, or the like; (v) performing a responsive, corrective, or remedial action with respect to the profanity; and (vi) consolidating the profanity filtered, individual audio streams into a filtered audio stream suitable for the collaboration session.

To perform profanity filtering, one or more devices of heterogenous computing platform 300 (e.g., aDSP 306 or high-performance AI device 308) may be assigned the execution of one or more respective AI models for performing speaker/source separation, profanity detection, and/or certain responsive action(s).

In various embodiments, one or more profanity filtering settings may be selected based upon contextual and/or telemetry information, which may change dynamically throughout the collaboration session. Moreover, rules usable by orchestrator 501A to apply profanity filtering settings may be provided in polic(ies) 603.

Examples of profanity filtering settings may include, but are not limited to: turning profanity filtering on or off, selection of a profanity filter model with varying levels of aggressiveness, permissiveness, and/or tolerance, an indication of a list of profane words or utterances, a speaker separation option, a list of one or more participants of the collaboration session whose respective audio stream is included in, or excluded from, profanity filtering, selection of a device within platform 300 for executing profanity filtering operations etc.

Other profanity filtering settings may also include the selection of responsive action(s) in case profanities are detected during the session. Examples of responsive actions may include, but are not limited to: adjusting the volume of one or more audio streams up or down, muting, replacing offensive content with non-offensive content, concealing the profanity with beeping or sound effects, flagging/notifying the offending participant, etc.

In some cases, contextual data may also be used to identify presence hint(s) and/or user engagement cue(s). Based upon these determinations, IHS 200 may modify its profanity filtering settings to enforce one or more rule(s) set up in polic(ies) 603.

As used herein, the term "presence hints" refers to any information usable to characterize whether a user is present or absent before IHS 200 during a collaboration session and/or a distance between the user IHS 200. In some cases, presence hints may include (or be derived from) data received from presence or proximity sensors 210, camera 310, peripheral devices 314 (e.g., whether the user is typing at a keyboard or moving a mouse), etc.

The term "user engagement cue" refers to any user's action, such as utterances, movements, stances, gestures (e.g., fingers, hand, arm, head, body, etc.), or other behavior indicative of whether and/or to what degree a user is engaged with aspects of collaboration session (e.g., audio or video) and/or IHS 200. In various implementations, to identify a user engagement cue, one or more devices in heterogenous computing platform 300 may be configured to perform speech and/or gesture recognition operations during a collaboration session based on audio and/or video data streams captured with a microphone and/or camera. Moreover, to determine a level of engagement of a user, orchestrator 501A may keep track of one or more engagement cues and calculate an engagement score based upon the number, frequency of occurrence, and/or weight of the detected cue(s).

Furthermore, as described in more detail below, systems and methods described herein may enable the deployment of firmware-based policies enforceable by IHS 200 and usable to manage profanity filtering operations during collaboration sessions autonomously and/or independently of host OS 400 and collaboration applications 412.

For example, an ITDM may wish to set different rules, triggers, and/or thresholds for selecting profanity filtering settings for different ones of IHSs 101A-N (or groups of IHSs) with different levels of granularity, based on context. A contextual rule may dictate that a particular IHS performance setting be selected or modified, for example: when an IHS is on battery power (or when the battery charge drops below or rises above a minimum value), when the IHS 200 is in a certain location (e.g., at work, at home, within a distance from selected coordinates, etc.), based on hardware utilization (e.g., a level of utilization of one or more of the devices in platform 300 reaches a maximum or minimum value), when the user of the IHS belongs to a selected group of users (e.g., "managers," "engineers," etc.), when the IHS is manipulated into a given posture, when the user is present or within a selected distance from IHS 200, etc.

Also, as features originally provided by collaboration applications 412 become adopted by and/or incorporated into host OS 400, it becomes important for ITDMs to be able to manage those features using a consistent interface, irrespective of whether they are provided by a given collaboration application 412 or host OS 400 itself. It is also important for an ITDM to manage profanity filtering settings in an OS-agnostic manner, without having to discover or install third-party software agents.

In some cases, profanity filtering settings may be further selected based upon one or more of: a location of the IHS, a language preference of a participant of the collaboration session, a number of processes, applications, and/or windows in concurrent execution during the collaboration session, a CPU usage metric, a memory usage metric, a network usage metric, a battery usage metric, etc.

Particularly, referring back to FIG. 6, orchestrator 501A may be implemented by sensor hub and low-power AI device 307 and/or by EC/BMC 209, and it may be configured to execute firmware service 601A. GPU 304 may execute firmware service 601B, high-performance AI device 308 may execute firmware service 601C, aDSP 306 may execute firmware service 601D, display 309 may execute firmware service 601E, and context detection devices 501F-N (e.g., modem 313, peripherals 314, etc.) may execute respective ones of firmware services 601F-N. In various embodiments, firmware services 601A-N may be performed through the execution of firmware components 503A-N previously distributed as extension drivers in a heterogenous computing platform 300-wide firmware installation package.

In operation, firmware services 601A-N may exchange messages or commands using one or more of APIs 502A-N to manage profanity filtering settings. Firmware services 601A-N may also exchange messages or commands using one or more of APIs 502A-N to perform speech recognition, gesture recognition, and/or gaze detection, to exchange user proximity information, and so on. Moreover, firmware services 601A-N may operate independently of host OS 400.

In some cases, firmware service 601A of orchestrator 501A may be configured to communicate with firmware services 501B-N to collect context and/or telemetry information. Additionally, or alternatively, firmware service 601A may communicate with host OS 400 to ascertain a current GUI environment of IHS 200 (e.g., number of windows open, number of minimized windows, number of applications 412-414 in execution, etc.). Additionally, or alternatively, firmware service 601A may instruct firmware services 601B-N to apply a particular AI model to an audio or video stream following one or more rules outlined in polic(ies) 603.

Figure 9:
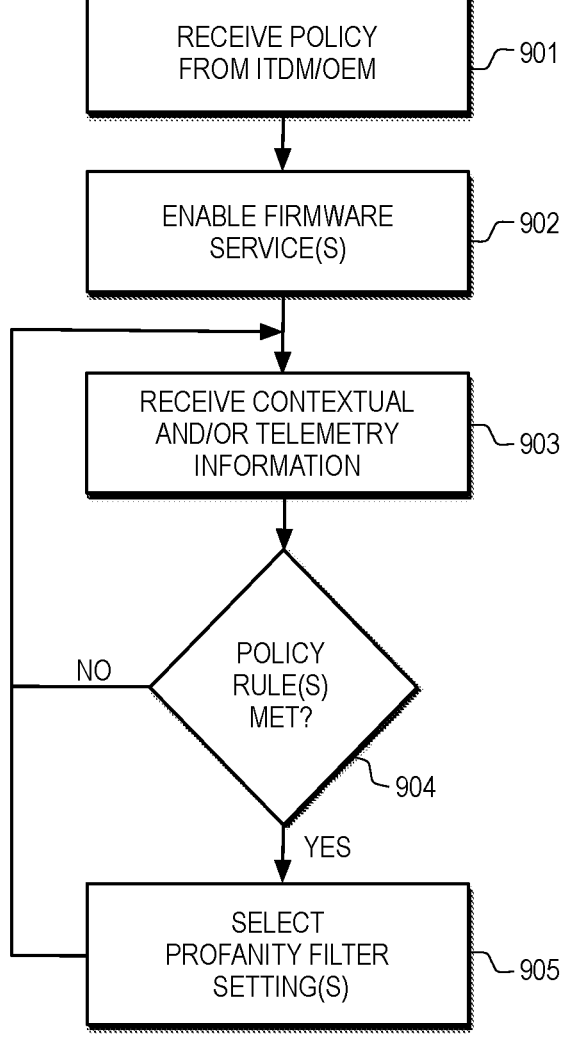
FIG. 9 is a flowchart illustrating an example of a method for managing profanity filter settings for collaboration sessions in heterogenous computing platforms, according to some embodiments.

Firmware service 601A may implement, enforce, or execute aspects of polic(ies) 603 to enable profanity filtering operations during collaboration sessions to be performed autonomously and/or independently of host OS 400, at least in part, by executing method 900 of FIG. 9. In various implementations, aspects of polic(ies) 603 may be enforced based upon contextual and/or telemetry information received from one or more of firmware services 601A-N via each service's API 502A-N.

FIG. 9 is a flowchart illustrating an example of method 900 for managing profanity filter settings for collaboration sessions in heterogenous computing platforms. In some embodiments, method 900 may be performed at least in part, through the execution of firmware instructions by devices within heterogeneous computing platform 300 (FIG. 3) of IHS 200 (FIG. 2) implementing one of IHSs 101A-N (FIG. 1), for example, prior to the detection of a collaboration session.

At 901, OS agent 413 receives polic(ies) 603 from ITDM/ OEM service 602. At 902, OS agent 413 enables firmware service 601A in orchestrator 501A. For example, orchestrator 501A may be executed by sensor hub and low-power AI device 307. At 903, firmware service 601A communicates with other services 601B-N to collect contextual and/or telemetry information from their respective devices in heterogeneous computing platform 300.

At 904, orchestrator 501A may determine whether the contextual and/or telemetry-based rules for modifying audio equalization settings or features specified in polic(ies) 603. If not, control returns to 903. Otherwise, at 905, orchestrator 501A may enforce polic(ies) 603 by selecting or modifying one or more profanity filter setting(s) based on context and/or telemetry (including user presence and/or engagement), as specified in polic(ies) 603, autonomously and/or independently of host OS 400.

Figure 10:
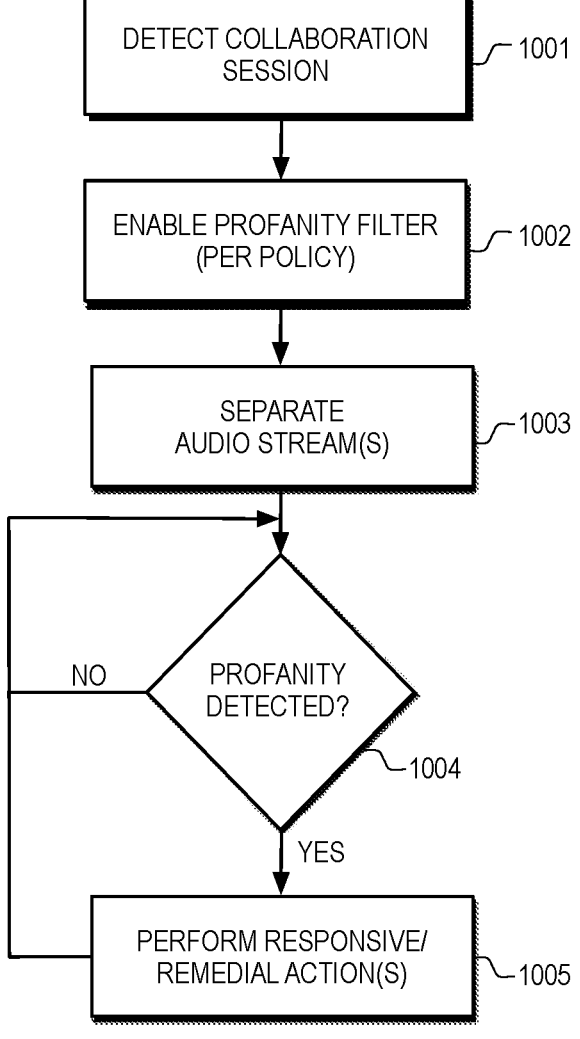
FIG. 10 is a flowchart illustrating an example of a method for filtering profanities during a collaboration session, according to some embodiments.

FIG. 10 is a flowchart illustrating an example of method 1000 for filtering profanities during a collaboration session. In some embodiments, method 1000 may be performed at least in part, through the execution of firmware instructions by devices within heterogeneous computing platform 300 (FIG. 3) of IHS 200 (FIG. 2) implementing one of IHSs 101A-N (FIG. 1), for example, in response to the detection of a collaboration session.

At 1001, orchestrator 501A detects a collaboration session. At 1002, orchestrator 501A enables profanity filtering with settings stipulated by polic(ies) 603 based on context and/or telemetry information. For example, orchestrator 501A may communicate with aDSP 306 to apply speaker separation to a combined audio stream at 1003 and to perform profanity detection upon each individual audio stream. At 1004, if profanity is detected, orchestrator 501A, control passes to 1005. Otherwise, control remains at 1004. At 1005, orchestrator 501A performs one or more responsive, corrective, or remedial action(s) as specified by polic(ies) 603.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a heterogeneous computing platform comprising a plurality of devices configured to communicate via a communication bus through at least one firmware service to firmware service Application Programming Interface (API) independent of any IHS host processor; and
   a memory coupled to the heterogeneous computing platform, wherein the memory comprises a plurality of sets of firmware instructions, wherein each set of firmware instructions, upon execution by a respective microcontroller of at least one device of the plurality of devices in a respective microcontroller memory space independent of an IHS host processor memory space wherein the IHS host processor is configured to execute at least an IHS Operating System (OS), configures the plurality of devices to provide a respective plurality of firmware services, wherein at least one device of the plurality of devices is configured as an orchestrator to perform operations that comprise:

receive a policy from an Information Technology Decision Maker (ITDM) or Original Equipment Manufacturer (OEM);

select a profanity filter setting usable during a collaboration session based, at least in part, upon the policy;

receive a combined audio stream that comprises audio from a plurality of remote participants in the collaboration session;

send a message, via the at least one firmware service to firmware service API without any involvement by the IHS OS or any IHS host processor, to cause another firmware service to execute at least a speaker source separation algorithm, wherein the other firmware service is configured to:

separate speech or utterances produced by the plurality of remote participants in the combined audio stream into a respective plurality of separated individual audio streams, based at least in part on the speaker source separation algorithm applied to the combined audio stream to generate the separated individual audio streams;

determine whether profanity is detected in each separated individual audio stream of the plurality of separated individual audio streams based at least in part on a match between at least one of the separated individual audio streams and a set of profanity audio signatures; and in response to a determination profanity is detected in at least one separated individual audio stream, send a message via the at least one firmware service to firmware service API without any involvement by the IHS OS or any IHS host processor, to cause another firmware service to replace the detected profanity in the at least one separated individual audio stream with another word or utterance to create at least one profanity filtered separated individual audio stream; and provide the collaboration session with access to a combined profanity filtered audio stream that comprises a plurality of profanity filtered separated individual audio streams.

2. The IHS of claim 1, wherein the heterogeneous computing platform comprises: a System-On-Chip (SoC), a Field-Programmable Gate Array (FPGA), or an Application-Specific Integrated Circuit (ASIC).

3. The IHS of claim 1, wherein the orchestrator comprises a sensing hub.

4. The IHS of claim 1, wherein the orchestrator comprises an Embedded Controller (EC) or Baseboard Management Controller (BMC).

5. The IHS of claim 1, wherein the collaboration session comprises an audio or video conference.

6. The IHS of claim 1, wherein the orchestrator is configured to receive a message or an instruction from an Operating System (OS) agent or application that indicates a start of the collaboration session.

7. The IHS of claim 1, wherein the profanity filter setting comprises an on or off setting.

8. The IHS of claim 1, wherein the profanity filter setting comprises one of a plurality of filtering modes, each filtering mode having a different level of aggressiveness or permissiveness.

9. The IHS of claim 1, wherein the profanity filter setting comprises an indication of at least one of: a list of profane words or utterances, or at least one profanity audio signature.

10. The IHS of claim 1, wherein an audio Digital Signal Processor (aDSP) is configured to separate the speech or utterances based at least in part on the speaker source separation algorithm.

11. The IHS of claim 10, wherein the orchestrator is further configured to send a message to a firmware service provided by the aDSP via the at least one firmware service to firmware service API without any involvement by the IHS OS or any IHS host processor to apply a profanity filtering model based on the profanity filter setting.

12. The IHS of claim 11, wherein the profanity filter setting identifies one or more participants of the collaboration session whose respective audio stream is included in, or excluded from, profanity filtering.

13. The IHS of claim 11, wherein the orchestrator is further configured to, upon detection of profanity in the audio stream, at least one of: adjust a volume of a microphone input, adjust a volume of an audio output, apply an audio effect to a portion of the audio stream, flag a participant responsible for the audio stream, or notify the participant, depending on the policy.

14. The IHS of claim 11, wherein application of the profanity filtering model is based, at least in part, upon contextual or telemetry information.

15. The IHS of claim 14, wherein the orchestrator is configured to receive the contextual or telemetry information as data from another device of the plurality of devices via the at least one firmware service to firmware service API.

16. The IHS of claim 14, wherein the contextual or telemetry information comprises at least one of: a level of utilization of one or more of the plurality of devices, a battery status, a location of the IHS, or an identity of a user of the IHS.

17. The IHS of claim 14, wherein the contextual or telemetry information indicates a user's presence with respect to the IHS.

18. The IHS of claim 14, wherein the contextual or telemetry information indicates a user's level of engagement with respect to the collaboration session.

19. A memory coupled to a heterogeneous computing platform, wherein the heterogeneous computing platform comprises a plurality of devices configured to communicate via a communication bus through at least one firmware service to firmware service Application Programming Interface (API) independent of any host processor, wherein the memory is configured to receive a plurality of sets of firmware instructions, wherein each set of firmware instructions, upon execution by a respective microcontroller of at least one device of the plurality of devices in a respective microcontroller memory space independent of a host processor memory space wherein the host processor is configured to execute at least an Operating System (OS), configures the plurality of devices to provide a respective plurality of firmware services, wherein at least one device of the plurality of devices operates is configured as an orchestrator configured to perform operations that comprise:

receive, from another device of the plurality of devices via the at least one firmware service to firmware service API without any involvement by the OS or any host processor, context information that comprises a user presence indication;

modify a profanity filter setting usable during a collaboration session to enforce a received policy, based, at least in part, upon the context information;

receive telemetry from at least one device of the plurality of devices via the at least one firmware service to firmware service API without any involvement by the OS or any host processor;

determine, based at least in part on the telemetry, whether a collaboration session is detected, based at least in part on detection of a pattern of utilization of the at least one device that would indicate a collaboration session is active; and in response to a determination the collaboration session is active:

receive a combined audio stream that comprises audio from a plurality of remote participants in the collaboration session;

send a message, via the at least one firmware service to firmware service API without any involvement by the OS or any host processor, to cause another firmware service to execute at least one algorithm by at least an audio Digital Signal Processor (aDSP) configured to:

separate speech or utterances produced by the plurality of remote participants in the combined audio stream into a respective plurality of separated individual audio streams, based at least in part on a speaker source separation algorithm applied to the combined audio stream to generate the separated individual audio streams;

determine whether profanity is detected in each separated individual audio stream of the plurality of separated individual audio streams, based at least in part on a match between at least one of the separated individual audio streams and a set of profanity audio signatures; and in response to a determination profanity is detected in at least one separated individual audio stream, send a message via the at least one firmware service to firmware service API without any involvement by the OS or any host processor, to cause another firmware service to replace the detected profanity in the at least one separated individual audio stream with another word or utterance to create at least one profanity filtered separated individual audio stream; and provide the collaboration session with access to a combined profanity filtered audio stream that comprises a plurality of profanity filtered separated individual audio streams.

20. A method comprising:

receiving, by an Information Handling System (IHS), a firmware installation package comprising extension drivers in a heterogeneous computing platform of the IHS, wherein the heterogeneous computing platform comprises a plurality of devices configured to communicate via a communication bus through at least one firmware service to firmware service Application Programming Interface (API) independent of any host processor, wherein upon execution by a respective microcontroller of at least one device of the plurality of devices in a respective microcontroller memory space independent of a host processor memory space wherein the host processor is configured to execute at least a host Operating System (OS), each extension driver causes a respective device to provide a firmware service to other devices of the plurality of devices via the at least one firmware service to firmware service API;

delivering an indication of a policy to an orchestrator among the plurality of devices, wherein the policy is usable by the orchestrator to filter out profanity during a collaboration session using the plurality of devices via the at least one firmware service to firmware service API, without any involvement by any host processor or host OS;

selecting a profanity filter setting usable during the collaboration session based, at least in part, upon the policy;

receiving a combined audio stream that comprises audio from a plurality of remote participants in the collaboration session;

sending a message, from the orchestrator via the at least one firmware service to firmware service API without any involvement by the host OS or any host processor, to cause another device of the plurality of devices to separate speech or utterances produced by the plurality of remote participants in the combined audio stream into a respective plurality of separated individual audio streams, using at least one digital signal processing algorithm comprising a speaker source separation algorithm applied to the combined audio stream to generate the separated individual audio streams;

determining whether profanity is detected in each separated individual audio stream of the plurality of separated individual audio streams, using the at least one digital signal processing algorithm and based at least in part on determining whether there is a match between at least one of the separated individual audio streams and a set of profanity audio signatures;

in response to determining profanity is detected in at least one separated individual audio stream, sending a message via the at least one firmware service to firmware service API without any involvement by the host OS or any host processor, to cause another device of the plurality of devices to replace the detected profanity in the at least one separated individual audio stream with another word or utterance to create at least one profanity filtered separated individual audio stream, using the at least one digital signal processing algorithm; and providing the collaboration session with access to a combined profanity filtered audio stream that comprises a plurality of profanity filtered separated individual audio streams.

\* \* \* \* \*